United States Patent
Soderstrom

(10) Patent No.: US 11,556,965 B2
(45) Date of Patent: Jan. 17, 2023

(54) CONSUMER CONTROLLED PORTFOLIO CHARITABLE GIVING SYSTEM AND METHOD

(71) Applicant: Change Up Inc., Wilmington, DE (US)

(72) Inventor: Robert W. Soderstrom, Los Angeles, CA (US)

(73) Assignee: Change Up Inc., Los Angeles, CA (US)

(*) Notice: Subject to any disclaimer, the term of this patent is extended or adjusted under 35 U.S.C. 154(b) by 0 days.

(21) Appl. No.: 17/394,388

(22) Filed: Aug. 4, 2021

(65) Prior Publication Data

US 2021/0390593 A1 Dec. 16, 2021

Related U.S. Application Data

(63) Continuation-in-part of application No. 17/153,313, filed on Jan. 20, 2021, which is a continuation-in-part of application No. 16/533,445, filed on Aug. 6, 2019, now Pat. No. 10,991,015, which is a continuation-in-part of application No. 16/532,874, (Continued)

(51) Int. Cl.
| | |
|---|---|
| *G06Q 30/02* | (2012.01) |
| *G06Q 40/06* | (2012.01) |
| *G06Q 20/32* | (2012.01) |
| *G06F 16/9535* | (2019.01) |
| *G06Q 40/02* | (2012.01) |
| *G06Q 20/38* | (2012.01) |

(52) U.S. Cl.
CPC ..... *G06Q 30/0279* (2013.01); *G06F 16/9535* (2019.01); *G06Q 20/326* (2020.05); *G06Q 40/02* (2013.01); *G06Q 40/06* (2013.01); *G06Q 20/321* (2020.05); *G06Q 20/388* (2013.01)

(58) Field of Classification Search
CPC .. G06Q 30/0279; G06Q 20/326; G06Q 40/02; G06Q 40/06; G06Q 20/321; G06Q 20/388; G06F 16/9535
USPC ...................................................... 705/3–44
See application file for complete search history.

(56) References Cited

U.S. PATENT DOCUMENTS

| | | |
|---|---|---|
| 5,546,303 A | 8/1996 | Helbling |
| 6,112,191 A | 8/2000 | Burke |

(Continued)

OTHER PUBLICATIONS

Gervino, "Creating charitable contribution policies", Bank Marketing 31.9: 11-12., American Bankers Association, Sep. 1999.*

(Continued)

*Primary Examiner* — Frantzy Poinvil
(74) *Attorney, Agent, or Firm* — Grumbles Law PLLC

(57) ABSTRACT

A donation facilitation system that can allow a donor, such as a customer, to challenge another entity, such as a provider, to make a provider contribution to a portfolio of multiple charities set up by the donor upon, for example, the purchase of a good or service from the provider. The provided portfolio donation facilitation system can allow the other entity such as a provider to create its own provider portfolio of multiple charities and make a provider contribution to a customer's portfolio of multiple charities when at least one component of the provider's portfolio of multiple charities matches at least one component of the customer's portfolio of charities. The provider makes the contribution to the charity or charities.

21 Claims, 13 Drawing Sheets

Related U.S. Application Data filed on Aug. 6, 2019, said application No. 16/533,445 is a continuation-in-part of application No. 15/181,781, filed on Jun. 14, 2016, which is a continuation-in-part of application No. 14/625,612, filed on Feb. 18, 2015, now abandoned, which is a continuation-in-part of application No. 13/738,949, filed on Jan. 10, 2013, now abandoned.

(60) Provisional application No. 62/851,452, filed on May 22, 2019, provisional application No. 61/610,912, filed on Mar. 14, 2012, provisional application No. 61/585,075, filed on Jan. 10, 2012.

(56) References Cited

U.S. PATENT DOCUMENTS

| | | |
|---|---|---|
| 6,876,971 B1 | 4/2005 | Burke |
| 7,571,849 B2 | 8/2009 | Burke |
| 8,010,450 B2 | 8/2011 | Palmer |
| 8,025,217 B2 | 9/2011 | Burke |
| 8,041,606 B2 | 10/2011 | Mascavage, III et al. |
| 8,160,922 B2 | 4/2012 | Postrel |
| 8,214,238 B1 | 7/2012 | Fairfield et al. |
| 8,214,287 B1 | 7/2012 | Garfield |
| 8,478,661 B1 | 7/2013 | Kressler |
| 8,484,142 B2 | 7/2013 | Pinckney |
| 8,583,549 B1* | 11/2013 | Mohsenzadeh ........ G06Q 30/02 705/38 |
| 8,615,445 B2 | 12/2013 | Dorsey |
| 8,635,137 B2 | 1/2014 | Carretta et al. |
| 8,639,619 B1 | 1/2014 | Priebatsch |
| 8,712,877 B2 | 4/2014 | Stremler et al. |
| 8,725,597 B2 | 5/2014 | Mauseth |
| 8,763,896 B2 | 7/2014 | Kushevsky |
| 9,245,231 B2 | 1/2016 | Pinckney |
| 9,754,294 B2 | 9/2017 | Hosny |
| 10,755,281 B1* | 8/2020 | Yip ................... G06Q 20/4016 |
| 10,878,424 B2* | 12/2020 | Tetali .................. G06Q 20/102 |
| 11,093,972 B1 | 8/2021 | Tietzen et al. |
| 2002/0032609 A1* | 3/2002 | Wilkman ........... G06Q 30/0207 705/14.1 |
| 2003/0177084 A1 | 9/2003 | Cassani et al. |
| 2003/0208432 A1 | 11/2003 | Wallman |
| 2004/0249735 A1 | 12/2004 | Cassani et al. |
| 2005/0021363 A1 | 1/2005 | Stimson et al. |
| 2005/0051617 A1* | 3/2005 | Gorelick ................ G06Q 20/10 235/379 |
| 2005/0167483 A1 | 8/2005 | Burke |
| 2005/0171849 A1 | 8/2005 | Brissette |
| 2006/0212390 A1 | 9/2006 | Gruber |
| 2006/0231608 A1 | 10/2006 | Gorelick |
| 2006/0235713 A1 | 10/2006 | Tobler et al. |
| 2006/0259424 A1 | 11/2006 | Turcotte et al. |
| 2007/0061252 A1 | 3/2007 | Burke |
| 2008/0222029 A1 | 9/2008 | Poster |
| 2008/0319896 A1* | 12/2008 | Carlson ................ G06Q 20/382 705/38 |
| 2009/0192873 A1 | 7/2009 | Marble |
| 2010/0010886 A1 | 1/2010 | Flynn, Jr. |
| 2010/0312650 A1 | 12/2010 | Pinckney |
| 2011/0047035 A1 | 2/2011 | Gidwani |
| 2011/0078050 A1 | 3/2011 | Schwartz |
| 2012/0047009 A1* | 2/2012 | Turner ................ G06Q 30/0238 705/14.38 |
| 2012/0185314 A1 | 7/2012 | Postrel |
| 2012/0317044 A1 | 12/2012 | Massarik |
| 2013/0151432 A1* | 6/2013 | Kashner ................ G06Q 40/02 705/329 |
| 2013/0151433 A1 | 6/2013 | Hicks et al. |
| 2013/0179347 A1 | 7/2013 | Soderstrom |
| 2013/0204801 A1* | 8/2013 | Downs ............... G06Q 30/0279 705/329 |
| 2013/0246145 A1 | 9/2013 | Ringewald |
| 2013/0268432 A1 | 10/2013 | Kressler |
| 2014/0129435 A1 | 5/2014 | Pardo |
| 2014/0156442 A1 | 6/2014 | Cushing |
| 2014/0365285 A1 | 12/2014 | Bahna et al. |
| 2014/0372319 A1 | 12/2014 | Wolovitz |
| 2015/0006426 A1 | 1/2015 | Sobhani et al. |
| 2015/0066742 A1* | 3/2015 | Chatterton ......... G06Q 20/3224 705/39 |
| 2015/0127530 A1 | 5/2015 | Wick |
| 2015/0161685 A1 | 6/2015 | Soderstrom |
| 2015/0332314 A1 | 11/2015 | Chakraborty |
| 2015/0348014 A1 | 12/2015 | Van Os |
| 2015/0348018 A1 | 12/2015 | Campos |
| 2015/0379591 A1 | 12/2015 | Massarik |
| 2016/0300283 A1 | 10/2016 | Soderstrom |
| 2017/0278125 A1* | 9/2017 | Tietzen ............. G06Q 30/0229 |
| 2018/0096325 A1 | 4/2018 | Panzo et al. |
| 2018/0330409 A1* | 11/2018 | Majzner ................ G06Q 30/08 |
| 2019/0362416 A1* | 11/2019 | Pesch .................... G06Q 30/08 |
| 2019/0392489 A1* | 12/2019 | Tietzen ................ H04L 9/0637 |
| 2020/0043062 A1 | 2/2020 | Soderstrom |
| 2020/0265482 A1 | 8/2020 | Mackoul et al. |
| 2020/0372552 A1 | 11/2020 | Soderstrom |
| 2021/0082005 A1 | 3/2021 | David et al. |

OTHER PUBLICATIONS

Office Action pertaining to U.S. Appl. No. 16/,532,874, dated Nov. 12, 2021.

Office Action pertaining to U.S. Appl. No. 17/153,313, dated Nov. 18, 2021.

Go Daddy Operating Company, LLC, Round Up for Charity, http://www.godaddy.com/charity/roundupforcharity.aspx?ci=46641. Accessed Apr. 10, 2013.

Elliot Silver, Go Daddy Checkout Option: "Round Up and Give to Hope for Haiti", www.Elliot'sBlog.com, Apr. 15, 2011.

Bank of America Corporation, The Keep the Change program makes savings automatic, http://www.bankofamerica.com/promos/jump/ktc_coinjar/index.cfm?&statecheck=MN Acc. Apr. 10, 2013.

Yelp, Tokens at Whole Foods? San Francisco, Yelp Local Questions & Answers, www.yelp.com/topic/san-francisco-tokens-at-whole-foods, Accessed Apr. 10, 2013.

Poinvil, Frantzy; Non-Final Office Action for U.S. Appl. No. 13/738,949; USPTO Communication; dated Dec. 12, 2013; 8pp.

Poinvil, Frantzy; Final Office Action for U.S. Appl. No. 13/738,949; USPTO Communication; dated Aug. 18, 2014; 7 pp.

Poinvil, Frantzy; Non-Final Office Action for U.S. Appl. No. 14/625,612; USPTO Communication; dated Jun. 2, 2015; 7 pp.

Poinvil, Frantzy; Final Office Action for U.S. Appl. No. 14/625,612; USPTO Communication; dated Jan. 20, 2016 10 pp.

Poinvil, Frantzy; Non-Final Office Action for U.S. Appl. No. 15/181,781; USPTO Communication; dated Aug. 24, 2018; 8 pp.

Poinvil, Frantzy; Final Office Action for U.S. Appl. No. 15/181,781; USPTO Communication; dated Feb. 15, 2019; 7 pp.

"Emirates Bank Adds du to its Online Payments Options", Proquest ID: 194842595, Publication info: Al Bawaba, London Jun. 28, 2007.

Poinvil, Frantzy; Non-Final Office Action for U.S. Appl. No. 16/533,445; USPTO Communication; dated Sep. 3, 2020; 19 pp.

Notice of Allowance dated Mar. 2, 2022 in corresponding U.S. Appl. No. 17/153,313.

* cited by examiner

CONSUMER CONTROLLED PORTFOLIO CHARITABLE GIVING SYSTEM AND METHOD

CROSS REFERENCE TO RELATED APPLICATIONS

This application is a continuation-in-part of U.S. patent application Ser. No. 17/153,313, filed Jan. 20, 2021, and titled, "CONSUMER CONTROLLED PORTFOLIO CHARITABLE GIVING SYSTEM AND METHOD", which is in turn a continuation-in-part of U.S. patent application Ser. No. 16/533,445, filed Aug. 6, 2019, now U.S. Pat. No. 10,991,015, and titled, "CONSUMER CONTROLLED CHARITABLE GIVING SYSTEM", which is in turn a continuation-in-part of U.S. patent application Ser. No. 16/532,874 filed on Aug. 6, 2019, and titled, "PORTFOLIO CHARITABLE GIVING SYSTEM", which in turn claims the benefit of U.S. Provisional Pat. Appl. No. 62/851,552, filed May 22, 2019, with the same title. This application is also a continuation-in-part of U.S. patent application Ser. No. 15/181,781, filed Jun. 14, 2016, and titled, "METHOD AND SYSTEM FOR FACILITATING DONATIONS", which is a continuation-in-part of U.S. patent application Ser. No. 14/625,612, filed Feb. 18, 2015 and a continuation-in-part of U.S. patent application Ser. No. 13/738,949, filed Jan. 10, 2013 which claims the benefit of U. S. Provisional application. Ser. No. 16/610,912, filed Mar. 14, 2012 and U.S. Provisional Appl. Ser. No. 61/585,075, filed Jan. 10, 2012. All of these applications are herein incorporated by reference in their entirety.

FIELD

The present disclosure relates to systems and methods that enable customers to challenge providers or other entities to make charitable contributions to charities of the customer's choice.

BACKGROUND

Charitable or philanthropic giving has been around for a long time. A main challenge for charitable organizations is to raise funds for their causes. Fundraising is expensive and requires a significant marketing effort. This is particularly problematic for small, relatively local charities—many of which, although they provide funding to areas popular with charitable donors, may be relatively unknown. Additionally, it is difficult for donors or customers to give to two or more charities at one time. Typically, the donors need to find each charity on separate websites and give either a one-time or a recurring donation to each charity. More recently, with the advent of portable electronic devices such as smart phones and tablets, charitable giving has been facilitated using applications that enable donors to give electronically. Systems are also known for small investors that allow them to utilize electronic devices to create and manage, on a cost-effective basis, a complex portfolio of securities, based upon the preferences of the investor. These systems can then initiate trades of the portfolio as a whole or in part in order to facilitate the wants and needs of the small investor.

Today, when a potential charitable donor researches a charity on the interne (or by other means), that donor typically visits many different websites collecting information which might not provide answers to them to make informed decisions on their donation. The landscape for charitable giving is fragmented with many single but different ways for the donor to give.

SUMMARY OF THE INVENTION

There is a need for a donation facilitation system that allows a donor, such as a customer or provider, to challenge another entity, such as a provider, to make a provider contribution to a charity or a portfolio of multiple charities set up by the customer upon, for example, the purchase of a good or service from the provider. There is also a need for a portfolio facilitation system that allows the other entity such as a provider to create its own provider portfolio of multiple charities and make a provider contribution to a customer's portfolio of multiple charities when at least one member of the provider's portfolio of multiple charities matches at least one member of the customer's portfolio of multiple charities. Additionally, there is a need for a customer to challenge providers such as financial institutions, processors or payment networks, card networks, merchants (providers) and individuals to make such a contribution to a provider charity or a portfolio of multiple charities.

In one aspect, a donation facilitation system is disclosed that includes a data storage that stores content. A computing device, of a customer, configured to execute at least one application and containing at least one processor in communication with a network. In some embodiments, a network server containing at least one processor in communication with the computing device in communication with the network. The network serve may include information about at least one charity, and communicates with the at least one application executed on the computing device, further wherein the network server performs. The disclosed system may further include receiving a challenge, from at least one application executed on the computing device associated with the at least one customer, when the customer purchases a good or service. The provider may receive the challenge for a contribution to the at least one charity associated with a customer portfolio. In other embodiments, the disclosed system may further include comparing, in response to the challenge, the at least one charity associated with the customer portfolio with the at least one charity associated with a provider portfolio to determine a match, which is based on likelihood of similarity of each of the respective charity in the portfolio. The disclosed system, in other embodiments, may further contribute the contribution by the provider to the match, which includes at least one charity. In some embodiments, the user may select the charities to contribute to by, in one possible embodiment, selecting the charity name at the graphical user interface of the computing device.

In another aspect of the donation facilitation system, the provider contribution is a fixed percentage of the purchase or a fixed fee based upon the purchase. In another aspect of the donation facilitation system, the customer portfolio information is stored in at least one of the data storage of the computing device and the network.

In one aspect, a donation facilitation system is disclosed that includes a donation facilitation system comprising a data storage in a computing device that stores content. The donation facilitation system may also include a network server containing at least one processor in communication with the computing device in communication with the network. The network serve may further include information about at least one charity, and communicates with the at least one application executed on the computing device. In other aspects, the computing device, of a customer, configured to execute at least one application and containing at least one processor in communication with a network, further wherein the computing device processors perform the steps of executing an app for purchasing goods or services. In some embodiments when purchasing goods or services, the system may send a challenge, from at least one application executed on the computing device associated with the at least one customer, when the customer purchases a good or service, wherein the provider receives the challenge for a contribution to the at least one charity associated with a customer portfolio. The system may further include comparing, in response to the challenge, the at least one charity associated with the customer portfolio with the at least one charity associated with a provider portfolio to determine a match, which is based on likelihood of similarity of each of the respective charity in the portfolio. The system disclosed may further select preferred charities and contribute the contribution by the provider to the match, which includes at least one charity.

In another embodiment, the donation facilitation system disclosed further comprises a challenge contribution made by the provider to the customer portfolio of multiple charities in response to the challenge. The customer portfolio information may be stored in at least one of the data storage of the computing device and the network, and is based on the price of the purchased good or service. In another embodiment, the provider contribution may comprise a fixed challenge amount or a rounding amount based on the purchase price.

In another embodiment, the donation facilitation system disclosed wherein the fixed challenge amount is based on at least one of a predetermined value, a fixed percentage of the price or the fixed challenge amount is a fixed fee per transaction. In some embodiments, the challenge may comprise a challenge amount. In another embodiment, the donation facilitation system disclosed may include the provider contribution that meets or exceeds the challenge amount, or is less than the challenge amount.

In another embodiment, the donation facilitation system disclosed wherein the contribution is stored in the network and the charities in the customer portfolio are updated and associated with preferences of the customer. The system may further comprise a server comprising the portfolio of customer charities, the portfolio of provider charities, or both. They system may further comprise at least one computing device in communication with the server.

In another embodiment, the at least one electronic device comprises a mobile device. In some embodiments, the at least one electronic device allows the provider to access the customer challenge, customer portfolio of charities, or the provider portfolio of charities. In some embodiments, the challenge contribution is made to a donor advised fund. The provider may comprise, in some embodiments, a financial institution, a processor, a payment network, a card network, merchants, or individuals.

In other embodiments, the method of facilitating donations comprising charging, by a provider, a customer a price for a good or service when the customer purchases said good or service using an application executed on a computing device, wherein the provider has a provider portfolio of multiple charities. In some embodiments, the method disclose may include challenging the provider to make a customer contribution, to at least one charity in a customer portfolio of charities, of part of the price or in addition to the price, wherein the challenge is made in response to the purchase. In some embodiments, the method disclosed may further include determining the provider making the customer contribution to the portfolio of multiple charities when at least one charity in the customer portfolio matches at least one charity in the provider portfolio of multiple charities matches at least one charity in the customer portfolio of charities, where the match is at least partially based on customer preferences. In yet other embodiments, the may further include contributing to the match at least one charity of the customer portfolio, wherein the provider makes the provider contribution.

In one aspect, the provider contribution comprises a fixed percentage of the price, or a fixed fee for each transaction. The method may further comprise using a server to store at least one of the portfolio of customer charities, the portfolio of provider charities, and the match based on customer preferences. In one aspect, the at least one computing device may be in communication with the server, wherein the server is part of a network. The computing device may comprise at least one of a mobile device, laptop, electronic notebook, desktop computer, smartwatch, tablet, smart phone, smart watch, and other electronic computing devices.

The provided donation facilitation system and method can enable a donor, such as a customer, provider, or both to challenge another entity, such as a provider, to make a provider contribution to a customer portfolio of multiple charities set up by the customer upon, for example, the purchase of a good or service from the provider. The disclosed portfolio donation facilitation system can allow the provider to create his or her own provider portfolio of multiple charities and make a provider contribution to a customer's portfolio of multiple charities when at least one component of the provider's portfolio of multiple charities matches at least one component of the customer's portfolio of multiple charities. In some embodiment, the disclosed method further includes using a server to store the portfolio of customer charities, the portfolio of provider charities, or both.

In this disclosure the term:

"additional contribution" refers to an extra payment made by a customer or consumer to the customer's portfolio when making a purchase from a provider;

"challenge" refers to an amount that the customer requests the provider to contribute to a customer portfolio of multiple charities;

"computing device" is a type of electronic device and includes but is not limited to mobile devices, desktop computers, mainframe computers, payment consoles, electronic payment device, credit card device, customer order device or other electronic computing devices;

"customer" refers to an individual or organization that receives goods or service associated with an executable application that communicates through a network system;

"customer portfolio" refers to a collection of multiple charities set up by a customer or consumer that typically includes from about 1 to about 10 or even more charities and is stored in a system server;

"donor advised fund" refers to a dedicated fund, often associated with a financial institution, that collects and stores donations to portfolios (and can earn interest or be a charity itself) and then can distribute or split the donations among the charities in the portfolio according to the rules for distribution of donations to portfolios;

"electronic device" refers to a broader term for 'computing device' and includes mobile devices, desktop computers, payment devices, order devices, purchase devices, mainframe computers or other electronic computing devices;

"fixed fee" refers to a fee that is a specific amount and particularly refers to a fee that is charged based upon a transaction and not based upon the amount of the transaction;

"fixed percentage" refers to a fee that is a percentage amount of a transaction; "match" refers to an at least partially similar characteristics of compared charities based on characteristics of the charity;

"mobile device" refers to smart phones, tablets, laptop computers, or any other portable computing device;

"payment network" refers to a way to move money from one party to another and, unless transactions happen in cash, require a payment system for a smooth transaction.

"preferences" and "preferred" refer to the likelihood that the customer would select the charity for donation and may be based on customer activity on applications and may include entered data.

"price" refers to the amount of money that is expected by a provider from a customer or consumer to obtain a desired good or service. Typically, the price is posted by the provider and is the undiscounted, regular cost of the good or service;

"provider" refers to an entity that offers goods or services for a price or a fee to a customer or consumer. A provider can be a bank or savings institution such as a credit union, a processor/payment network, card networks, merchants, or individuals;

"provider contribution" refers to a payment made by the provider to the customer's portfolio of charities; in some embodiments the provider contribution is independent of whether or not a customer contribution was made. The provider contribution may be made based on at least one of a match, the purchase price, a percentage, and fixed amount. Another embodiment may include when there is no customer purchase and provider contributes anyway.

"provider portfolio" refers to a collection of at least one charity set up by a provider and the information may be stored in a system server in association with the provider;

"rounded-up" or "round-up" refers to the process of agreeing to pay a price for a good or service and then adding an additional amount (for charitable purposes) to the price to the next dollar or a higher payment amount; and "rules for distribution of donations to portfolios" refers to predetermined splits with predetermined ratios for disseminating funds amassed by portfolios into the charities contained in that portfolio.

The above summary is not intended to describe each disclosed embodiment of every implementation of the present disclosure. The brief description of the drawings and the detailed description which follows more particularly exemplify illustrative embodiments. In the drawings, the layers are not necessarily drawn to scale.

DETAILED DESCRIPTION

Figure 1:
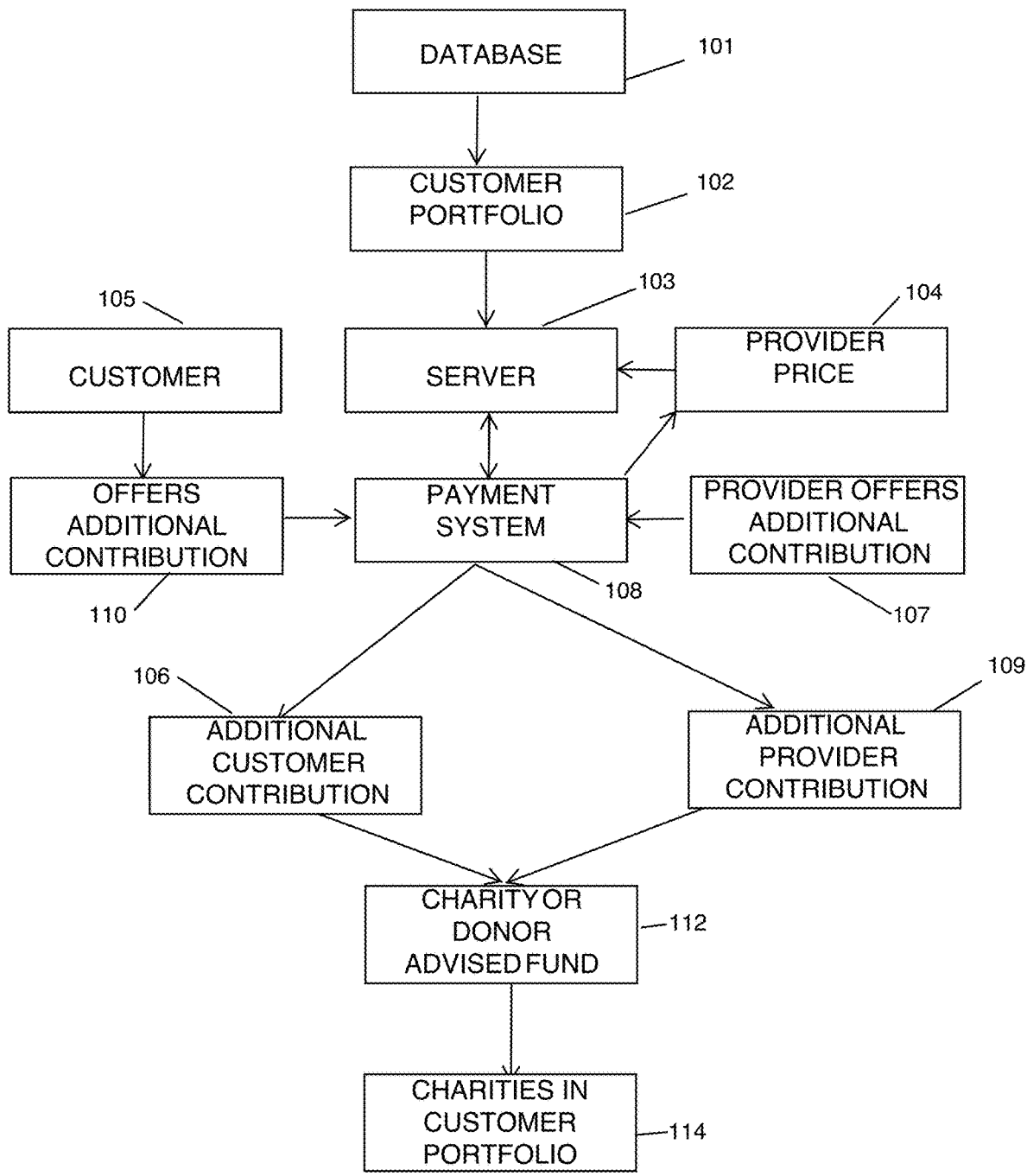
FIG. 1 is flow chart of one embodiment according to the provided disclosure where the customer challenges the provider to make a donation to the customer's portfolio.

Various customer interfaces and embodiments will be described in detail with reference to the drawings, wherein like reference numerals represent like parts and assemblies throughout the several views. Reference to various embodiments does not limit the scope of the claims attached hereto. Additionally, any examples set forth in this specification are not intended to be limiting and merely set forth some of the many possible embodiments for the appended claims. It is understood that various omissions and substitutions of equivalents are contemplated as circumstances may suggest or render expedient, but these are intended to cover applications or embodiments without departing from the spirit or scope of the claims attached hereto. Also, it is to be understood that the phraseology and terminology used herein are for the purpose of description and should not be regarded as limiting.

Retailers often ask customers or consumers if they would like to round-up a purchase of a good or service to the nearest dollar for a charity selected by that store. However, this can be an unfulfilling experience for the retailer or the customer for a number of reasons. First, the customer may not care about the charity selected by the store for the retailer contribution. Second, it is rare that confirmation is received that the donation ever makes it to the charity. Lastly, the verbal back-and-forth with the retailer can take time and can be annoying or embarrassing. In other words, it's not a personal experience based on the customer's preferences, nor is the process efficient in real-time with the purchase. In other examples, it also doesn't allow the customer to maintain a portfolio of preferences, which may be determined by the computing device, usage of applications executed on the computing device, saved lists, predetermined charities, and/or a user selection, which in some embodiments may be based on a search or a list. In some embodiments, the information is stored on the computing device, in a customer account, or a remote server in communication with a network and/or with the computing device. In some instances, the computing device may communicate with the network or other executable applications to determine charities and donation information and in real-time. The computing device may use the charity selection or contribution information to update the customer preference information, so that the next retailer purchase will use the information, as well as other user preference information, to determine the user's preferences. This disclosure makes the contribution to at least one charity more personal and expedites the process.

Providers often ask customers or consumers if they would like to "round-up" a purchase of a good or service to the nearest dollar for a charity selected by that store. However, this can be an unfulfilling experience for the provider or the customer for a number of reasons. First, the customer may not care about the charity selected for the provider contribution. Second, it is rare that confirmation is received that the donation ever makes it to the charity. Lastly, the verbal back-and-forth with the provider can take time and can be annoying or embarrassing.

The system presented herein turns this system upside down by empowering the customer to challenge the provider to "round-up" or to add an amount over a purchase price of the good or service for the customer's charity of choice, or portfolio of charities. In some embodiments, the provider can offer a discount from the purchase price to the consumer in exchange for having the provider make up at least a portion of the discount to the customer's portfolio of multiple charities. There are different embodiments of when the provider makes the contribution. In some, the provider may contribute when the challenge is made, and in some embodiments, when the customer also contributes. In other embodiments, the provider contribution may be made independent of the customer's contribution, such as if the customer does not make a contribution in this way, the customer still "challenges" the provider to make a donation even if the customer is not donating themselves, or independent of a customer contribution. In other embodiments, the provided system also can also send a notification to both the provider and the customer when the donation is eventually made to the end charity or portfolio of charities. In the provided system, the charitable transaction can occur automatically in a digital conversation that can happen in the background. Essentially, the provider can reward the customer for the customer's business by donating to a charity or portfolio of charities of the customer's choice.

In some embodiments, the system disclosed in the provided disclosure may be incorporated directly into a digital wallet on a mobile device. In other embodiments, the provided disclosure may be a standalone application on a mobile device that interfaces with a digital wallet or links to a real credit card. In yet other embodiments, the provided disclosure may include a "bill-pay" application on a banking website. The provided system can allow the consumer to aggregate donations in a charitable portfolio. The provided system can allow the provider to make a single donation that is distributed to multiple charities at the same time. The system can further permit various types of communication, including social media communication and notification, related to donation and aggregation activity.

Copending U.S. patent application Ser. No. 17/153,313, filed Jan. 20, 2021 (Soderstrom) discloses a "CONSUMER CONTROLLED PORTFOLIO CHARITABLE GIVING SYSTEM AND METHOD". In this application systems and methods are disclosed that allow a donor, such as a retailer, to make a retailer contribution to a portfolio of multiple charities set up by the donor upon, for example, the purchase of a good or service from the retailer.

Copending U.S. patent application Ser. No. 16/533,445, filed Aug. 6, 2019 (Soderstrom) discloses a "CONSUMER CONTROLLED CHARITABLE GIVING SYSTEM". In this application systems and methods are disclosed that allow a donor, such as a retailer, to make a retailer contribution to a portfolio of multiple charities set up by the donor upon, for example, the purchase of a good or service from the retailer.

Copending U.S. patent application Ser. No. 15/181,781, filed on Jun. 14, 2016 (Soderstrom) discloses a "METHOD AND SYSTEM FOR FACILITATING DONATIONS". In this application methods and systems are disclosed that allows using a computer system that includes at least one server and at least one computing device, that can be a mobile device, to communicably couple the server to the device through a communication network. In some embodiments, the method includes a provider charging a customer a price, the customer offering to make an electronic payment for the price through the computing device, the computing device presenting and customer contribution option to the customer, the customer selecting the customer contribution option, either upon activating the technology, or the technology executing prestored payment option, and making the customer contribution to a donor advised fund. In some embodiments, the customer contribution can be a "rounded-up" amount that the customer adds on to the provider's price with the intention that it will be directed to a charity of the customer's choosing.

Copending U.S. patent application Ser. No. 16/532,874 (also, Soderstrom) filed on the same day herewith, to a "PORTFOLIO CHARITABLE GIVING SYSTEM" that discloses a method and systems of facilitating donations that includes a donor making a charitable donation to a portfolio that includes multiple charities set up by a customer or donor that, in some embodiments, can be a customer or consumer. The method and system include rules set up by the donor for distributing the charitable donation among the charities in the portfolio in a single step at a predetermined time. The rules can be changed by the donor as well as the make-up of the portfolio of charities.

The provided disclosure relates to systems and methods that allow a customer or consumer to challenge a provider to contribute to, to match, or to exceed a customer contribution made to a portfolio of charities upon a purchase of a good or service. The customer can direct a customer contribution to be made to the customer's portfolio of multiple charities and then can "challenge" the provider to make a challenge contribution. In some embodiments, the customer or the provider portfolio of multiple charities may contain only one charity. In some embodiments, the provider may not agree to contribute the whole amount in the consumer's challenge but may be willing to give a portion of the challenged amount to the customer's portfolio. The provider contribution to the customer portfolio of multiple charities can be a fixed percentage of the purchase price of the good or service, a fixed fee based upon the purchase transaction, or, in some embodiments both a fixed percentage and a fixed fee.

As an example, when a customer swipes a MASTERCARD credit card, typically there is a 2.9% fee for the use of software since financial institutions, processors, payment networks, card networks, and providers are all software providers in financial technology. On a $100 purchase, this 2.9% would amount to $2.90. Every entity in the software chain who makes the transaction happen gets a portion of the $2.90. Typically, the issuing bank (the bank that issued the credit card) gets the largest share. The card network (such as MASTERCARD) gets the smallest share since the bank works hardest to win and keep the customer. The processors also get a cut of the fee. Of the $2.90 fee from this example, some of the providers involved in the transaction(s) might be willing to give a portion of their cut to charity. In fact, one processor already gives 7 cents per card swipe to charity. This processor gives to charity to encourage use of their card through loyalty more than for direct revenue.

Typically, the customer contributions and provider contributions are held in a donor advised fund. This fund, which can additionally be a charitable fund, can be used to escrow the customer contributions and contributions to the customer's portfolio and collect them until, at a predetermined time as, for example, at the end of a week, a month, a quarter, a year, or any other time period, money in the donor advised fund can be distributed to the charities in the customer's portfolio according to rules that have been established by the curator of the customer's portfolio. Alternatively, the funds may be distributed directly to the end charities. The curator can be the customer him or herself, or another entity, which maintains the charitable portfolio by swapping charities in and out of the portfolio. In some embodiments, the curator can be or can act at the direction of a giving circle or group of people (or club) that come together to determine, as a group, sometimes by a vote, which charities to list in the portfolio.

The provided disclosure relates to systems and methods that allow a customer or consumer to challenge a retailer to contribute to, match, or exceed a customer contribution (in addition to the price) made to a portfolio of vetted charities. The customer can direct an customer contribution to be made to the customer's portfolio of vetted multiple charities and then can "challenge" the retailer to make an retailer contribution. Typically, the customer contributions and retailer contributions are held in a donor advised fund. This fund, which can additionally be a charitable fund, is used to escrow the customer contributions and contributions to the customer's portfolio and collect them until, at a predetermined time as, for example, at the end of a week, a month, a quarter, a year, or any other time period, money in the donor advised fund is distributed to the vetted charities in the customer's portfolio according to rules that have been established by the curator of the customer's portfolio. Alternatively, the funds may be distributed directly to the end charities. The curator can be the customer him or herself, or another entity, which maintains the charitable portfolio by swapping charities in and out of the portfolio. In some embodiments, the curator can be or can act at the direction of a giving circle or group of people (or club) that come together to determine, as a group, sometimes by a vote, which charities to list in the portfolio.

A curator (who may be an individual such as a customer or a provider) can construct a portfolio that includes some of his or her favorite charities. In other embodiments, a portfolio can include a larger number of individual charities. In some embodiments, the charities can have a theme or be related in one way or another (for example, the charities can comprise local school PTA organizations or Boy/Girl scouts). In other embodiments, the portfolio can include charities with a theme such as environmental, medical research, philanthropic goal-oriented themes or others. In some other embodiments the charities are only related to each other in that they are selected by the curator for personal reasons.

In some embodiments, a donation facilitation system is provided that can include a server programmed and configured to host a payment system. The server can be in communication with a mobile device of a customer or consumer and also in communication with an electronic device of a provider. The customer can be provided with an opportunity to make an electronic payment into the payment system of a price charged by a provider for a good or service. The server can be in communication with a mobile device (such as a smart phone of the provider or customer) or another electronic device (of either the provider or the customer). In some embodiments, the server can host a payment system. Exemplary systems that can be useful in this disclosure include CHANGEUP, or KICKSTARTER or other platforms that include electronic payment collection and distribution functions. The provided disclosure will focus on the CHANGEUP platform as an example but should not be construed to be limited only to this platform. There are many others.

In one embodiment presented herein, both providers and customers can join the CHANGEUP platform and can create their own portfolios. The portfolio may hold anywhere from 1 to one million charities. In some embodiments, a customer may have a portfolio that has about 10 charities and a provider may have a portfolio that has, for example, 61,212 charities ("all public high schools in America") plus all environmental organizations, and also the American Red Cross.

Then, by way of example, the CHANGEUP platform can allow these two portfolios to communicate with each other to determine if any of the charitable members of each of the two portfolios match. After a consumer has linked his payment method to the platform, the consumer can go out and use a payment method such as a credit or debit card. When the payment method is used at a provider that has also joined the platform, the provided system can determine if the customer and the provider share an affinity for at least one charity in their respective portfolios (or if there is a match between one or more charities in the customer's portfolio and the provider's portfolio). If there is a match of at least one or more charities in each portfolio then the provider will be notified via a report that funds will be withdrawn from the provider's linked payment method account and sent to that particular charity on behalf of the customer. In some embodiments, rules can be set up by either the customer or the provider that more than one charity needs to match before the funds are transferred.

In the provided but not limiting example, CHANGEUP can compare the portfolio of the customer and the portfolio of the provider to find one or more matches. If there are one or more matches then CHANGEUP may add customer contributions or provider contributions based upon rules or rankings set up and applied by the consumer and the provider, individually, on each of their respective portfolios. If a match is found, then funds can be transferred from the provider into a donor advised fund that will hold the funds until they are distributed to the respective charities in common with both portfolios according to the distribution frequency and rules set up for the platform.

Providers may show a physical symbol or sticker that announces the ability for a customer to utilize the present invention at that provider's place of business and therefore partner with that provider (in a way) support their customer's portfolios of charitable contributions. Additionally, providers can support their own portfolios of charitable organizations for reasons such as attracting customer to their products, pursing their own altruistic goals, or to decrease their tax liability.

It is also contemplated that providers can include banks, savings institutions, credit unions or other financial institutions. They can, as a provider, offer customer contributions to charities of the customer's choice in order to attract additional business.

In some embodiments, processors can include payment networks. Examples of common payment networks today include VISA, MASTERCARD, and MAESTRO, to name a few. Other non-limiting examples of payment networks include financial services providers such as, for example, FIRST DATA, FiSERVE, STRIPE, ADMEN and others.

In some embodiments, a provider may have a non-profit organization or fundraising campaign that it supports (for example, the Red Cross), and a customer can elect to donate rounded up amount to the provider's campaign, and/or split the rounded-up amount between the provider's campaign and the customer's campaign.

In another embodiment, the customer can designate or be notified by specific providers in advance and receive location-specific messages (via GPS, Wi-Fi, or other location technologies), offers or benefits when in proximity to a provider participating in the program. The customer can also designate certain non-profits or charitable institutions whose location may trigger similar notices or messages. Thus, the customer on foot could be alerted to the existence of a provider or non-profit and engage in a purchase, yielding additional savings, or make a donation.

A customer may assign an identifier such as a name, number, or moniker to the customer's personal fundraising cause. This identifier can be associated with that customer's efforts to raise money. The customer can utilize that name or number to recruit friends to a particular fundraising campaign. This can also cause location-specific notices to be sent to friends when they are in physical proximity to a participating provider or designated non-profit.

In some embodiments, the rounded-up amount may be incorporated into an online retail store and catalogue where customers can round up their purchases, but also share with others their own "store" on social networking sites that promote products they like.

In some embodiments, the provided disclosure can track the spending habits of an individual instead of, or in addition to, operating as a payment system. The system can read the individual's payment or donation history and can offer analyses of the data, such as amount spent over the previous week, month, year, etc. In some embodiments, the disclosed system and method can be integrated with social media and social networking sites. The system can be a social media platform that uses an algorithm to measure, accumulate, and direct customer's transactional "round-up" on purchases into fundraising campaigns.

The integration of the disclosed system and method with social networking sites can allow customers to lead, promote and contribute to fundraising campaigns using a previously designated character or combination of characters that is/are inter-operable with a mobile application or any other application that relates to the present invention, like a digital wallet application, and allows customers to automatically apply their rounded up amounts to a non-profit organization or fundraising campaign of their choosing. The "rounded-up" amounts may be applied on a one-time basis in some examples or may be applied for a specified period of time (i.e., one month).

In some embodiments, the disclosed application may send a notification to the customer or to the recipient of funds (for example, a non-profit organization or fundraising campaign) when funds are donated using the system. These notifications may be sent to a customer or fund recipient through a social network, such as TWITTER or FACEBOOK, or may be sent by other delivery routes such as email or text message. Updates to a customer's social networking profile related to the present invention can be done in any way that is allowed by the social networking site, for example by use of a personal computer, smart phone or other mobile device.

The present disclosure can also be used in social media to facilitate gamification of fundraising campaigns. More specifically, the invention can not only provide technology that allows customers to "round-up" their purchases, but also can bundle those "round-up" purchases into a larger marketplace that can assigns values and can directs those values to a specific campaign.

For example, a customer can choose a specific organization or a general category, such as climate change, for a fundraising effort to which they want to donate. If the customer chooses to donate to a general category, the specific organization that will receive the donation can be dependent upon the organization's social media presence, with the organization that receives the most social media attention being the organization that also receives the most, or all, of the general category donations.

In one embodiment, customers can elect, at the time of the donation, whether or not their donations are subject to the various competitions or challenges. Alternatively, customers can opt out of the competition and simply assign their donations to a single cause of their choice. In another embodiment of the competition or challenge, customers may be able to create a one on one competition, wherein each customer supports a specific organization and the customers attempt to increase their representative organization's scores by having other customers donate to one of the two organizations in the competition. One example of where this type of competition could be especially effective is when public figures, such as celebrities, engage in a public competition to bring awareness to causes and to foster friendly competition among fans. In one embodiment, at the end of the competition, the organization that has the highest score can win the other organization's accumulated donations.

In a further embodiment, concerts, sporting events, and retail outlets can compete against each other to send all of their "round-up" transactions to pre-chosen causes. For example, all National Football League (NFL) stadiums in a given day can compete against each other to see which stadium's fan base can bring the most attention to a local cause on social media. The stadium that ends the competition with the greatest number of points (for example, by using a formula similar to the one described above) can win all of the "round-up" donations for that week.

In one embodiment, leaderboards can be created for individual customers. For example, each customer can be rated according to the total number or total value of "round-up" donations the customer generates and the amount of social media interactions the customer receives. The individual leaderboard can be determined using a formula similar to the variations described above. Customers can then compete against each other to generate the greatest number or value of "round-up" donations for a particular cause, such as, but not limited to, an alma mater, non-governmental organization, political campaign, hospital campaign, etc. In one embodiment, as motivation, the top ten leaders on each leaderboard for each category of cause can get special treatment from that cause.

In some embodiments, customers can track their donations and voluntarily donate to their campaign even if they are not making a purchase. This may enable a customer to be placed on a leaderboard or be placed further up on the leaderboard for a specific month. By enabling competitive donations, the system may encourage individuals to share leaderboard news on social media and/or challenge others. In some embodiments, if a customer is a leader over a predetermined amount of time (i.e., twelve months), the customer can be rewarded.

In one embodiment, customers who have amassed a pre-defined threshold of "round-up" donations or who have become top customers through the leaderboard can operate as "bundlers". Bundlers can be trusted leaders in the donation community who are eligible to receive the "round-up" donations from other customers who trust the bundler to disperse the funds wisely. Further, a bundler can receive a small commission for each customer the bundler invites to use the system, thus building the bundler's value with every customer recruited.

In some embodiments, bundlers can operate as a form of electoral college, wherein all of the bundler's constituents move "round-up" donations through them. This can infuse the provided system with politics, competition, and lobbying that allows for dynamic interactions. If a customer does not want to be involved in this type of system, however, the customer can opt out of the leaderboard feature and simply engage as a standalone experience where the customer has a direct relationship with the cause the customer is benefitting. This would be appropriate if a customer was donating to, for example, a grandchild's college fund.

Millions of people may round up amounts on purchases daily, therefore contributing large amounts of monies into a central holding fund, which may operate as a bank of sorts, or a mutual fund that grows, earns interest, and delivers dividends. Therefore, a customer can "donate" to his or her own account in order to save or invest money.

In some other embodiments, another party such as a foundation may also participate in the customer challenging a provider and may add an additional contribution to the customer's portfolio, perhaps as an incentive to shop at the provider.

In another embodiment, customers may compete with each other in a contest for the greatest number of contributions per time period, the largest sum total of contributions per time period, or other statistics related to use of a customer challenge. Additionally, a "lottery" type of system can be used such as picking a number of contributions that would be the winner in any given time period. These competitions or lotteries can have provider contributions to the charity or to the customer as a prize and can be used as an incentive to promote use of the customer challenge system.

As noted, the provided system and methods can work in combination with existing digital wallet applications or be its own digital wallet application with the "round-up" functionality and social network engagement embedded therein.

Turning now to the Figures which exemplify parts of the provided system and methods, FIG. 1 is flow chart of one embodiment according to the provided disclosure where the customer challenges the provider to make a donation to the customer's portfolio. Database 101 is used as the source of charities are selected by the customer for inclusion in customer's portfolio 102. The list of charities can be by a third party, by a process that eliminates organizations that engage in criminal, unethical, or otherwise undesirable practices. The charities, known as the net number of charities, can then be used by the user, customer, or provider to create a personalized portfolio. These can be for national, regional, or local charities such as, for example, listing well-known charity organizations such as the National Audubon Society or the American Cancer Society, lesser known and more localized charities such as the Los Angeles branch of the Humane Society, or very localized charities such as the PTA of a local school. These charities can be selected to create a personalized portfolio for each charitable donator. Other examples of custom portfolios are discussed below.

Customer portfolio 102 is stored in server 103 and is in communication with a payment system stored therein. Provider 104 offers a good or service for a price. Customer 105 wishes to purchase the good or price from the provider through payment system 108. In one embodiment, customer 105 can offer to pay the price along with a customer contribution (which may be a "round-up" to the nearest dollar) as shown in 106. Payment system 108 which is in communication with server 103 takes the payment 106 from the customer and then pays the price to provider 104. Provider 104 has also offered to customer 105 to pay a provider contribution 109 through payment system 108. The customer contribution 110 offered by customer 105 and the provider contribution offered by provider 104 are then transferred from payment system 108 to a donor advised fund 112 and then eventually paid to the charities in customer portfolio 102 according to rules set up for the distribution of funds to the individual charities in the customer's portfolio. In some embodiments, the additional contribution 106 or 109 can be distributed directly to charities in customer portfolio 114. In FIG. 1, customer accesses server 103 and payment system 104 through a mobile device. Provider uses an electronic device to also access server 103. In another embodiment, similarly in this way, the provider or merchant may pay the charity, so that the purchaser or customer is not involved in the actual transfer of money or payment. The customer may authorize the contribution or payment, but may not be involved in the transfer of money.

Figure 2:
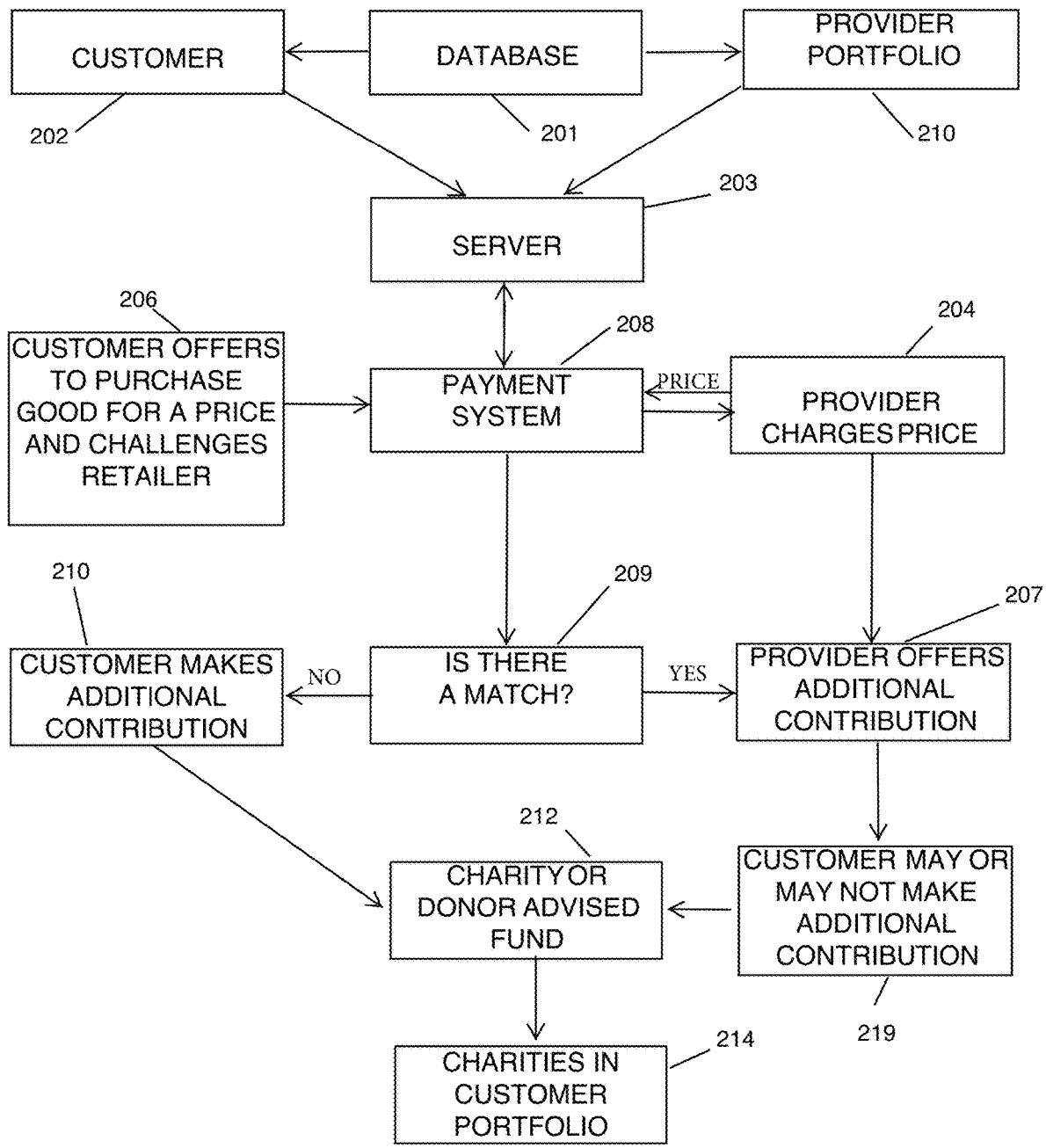
FIG. 2 is a flow chart of another embodiment according to the provided disclosure where the customer challenges the provider to make a donation to the customer's portfolio if there is a match between at least one charity in the customer's portfolio and the provider's portfolio.

FIG. 2 is a flow chart of another embodiment according to the provided disclosure where the customer challenges the provider to make a donation to the customer's portfolio if there is a match between at least one charity in the customer's portfolio and the provider's portfolio. In FIG. 2, a consumer portfolio 202 and a provider portfolio 210 are assembled from database 201 and both are stored in server 203. In the system illustrated in FIG. 2, provider 204 offers a price for a good or service through payment system 208. Customer 206 offers to buy the good or service offered by provider 204 for a price charged by provider 204 and challenges provider 204 to offer to make a provider contribution 207 to donor advised fund 212 if there is a match 209 between at least one member in provider portfolio 210 and customer portfolio 202. If there is no match, customer 206 can still make a payment to provider 204 for the good or service through payment system 208 and can still have his own customer contribution to his donor advised fund 212. However, the customer may decide not to purchase anything unless there is a match of at least one member of customer's portfolio and provider's portfolio. If there is a match 209 then customer may or may not make an additional contribution 210. Provider 207 makes a provider contribution to customer's donor advised fund 212 that is in addition the customer contribution to that fund. In some embodiments, the provider can offer to give a contribution to the customer's portfolio if, for example, the customer agrees to buy from the provider or for any other promotional reason.

Figure 3:
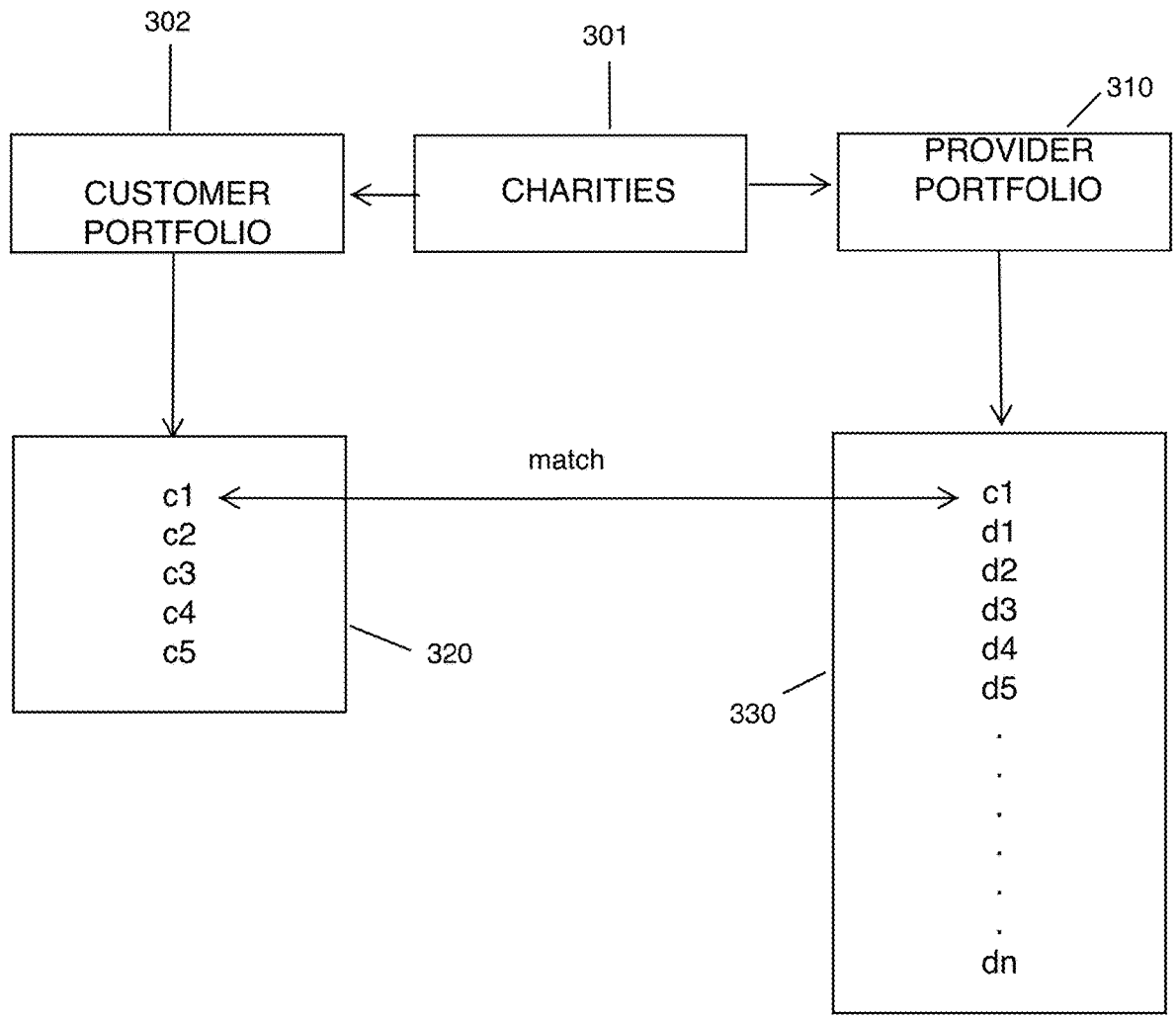
FIG. 3 is flow chart showing matching between at least one member of a customer's portfolio and at least one member of a provider's portfolio.

FIG. 3 is flow chart showing matching between at least one member of a customer's portfolio and at least one member of a provider's portfolio. In FIG. 3, customer portfolio 302 has charities (c1, c2, c3, c4, and c5) selected from charities 301 as shown in 320. Similarly, provider portfolio 310 has many more charities selected from charities 301. In the exemplified case provider portfolio includes (c1, d1, . . . , dn). Since both customer portfolio 320 and provider portfolio 330 have one of the same charities, namely c1, there is a match in this embodiment.

Figure 4:
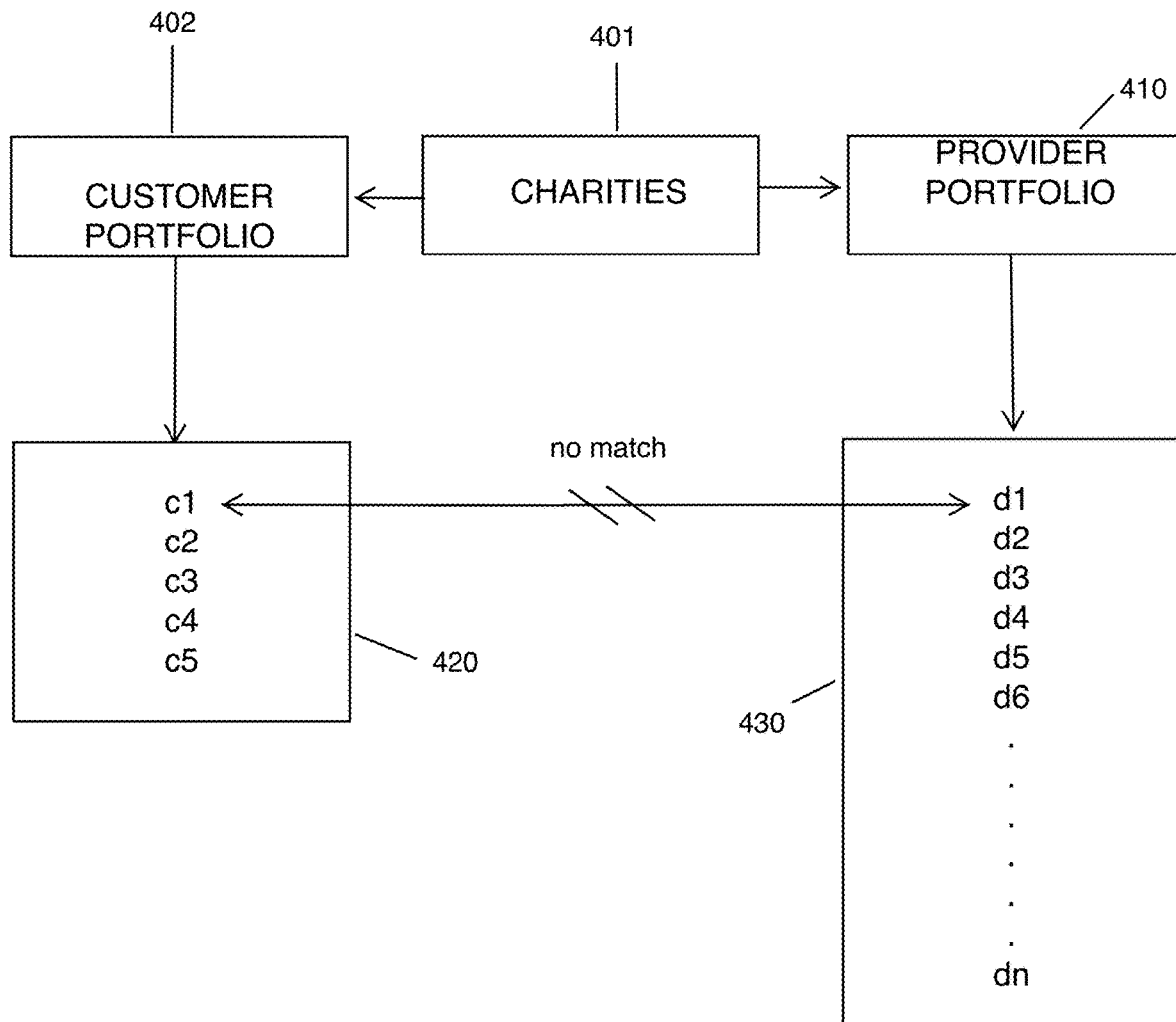
FIG. 4 is flow chart showing no matching between at least one member of a customer's portfolio and at least one member of a provider's portfolio.

FIG. 4 is flow chart showing no matching between at least one member of a customer's portfolio and at least one member of a provider's portfolio. In FIG. 4, customer portfolio 402 has charities (c1, c2, c3, c4, and c5) selected from charities 401 as shown in 420. Similarly, provider portfolio 410 has many more charities selected from charities 401. In the exemplified case provider portfolio includes (d1, . . . , dn). Since neither customer portfolio 420 nor provider portfolio 430 have any of the came charities, there is no match in this embodiment.

Figure 5:
FIG. 5 is a screen shot of an exemplary embodiment of the present disclosure of a customer's portfolio that includes three charitable organizations.

FIG. 5 is an iPhone screen shot of an exemplary embodiment of the present disclosure of a customer's portfolio that includes three charitable organizations. The screen shot in FIG. 5 uses the CHANGEUP app on an iPhone and shows one customer's portfolio that includes three charities— Friends of Ivanhoe School, Human Rights Campaign, and water.org. In this embodiment, to date the customer has made a $6.21 customer contribution to his portfolio and multiple providers have made a similar $6.21 provider contribution to the customer's portfolio as shown in the total of $12.42 donated to the portfolio by both donations.

Figure 6:
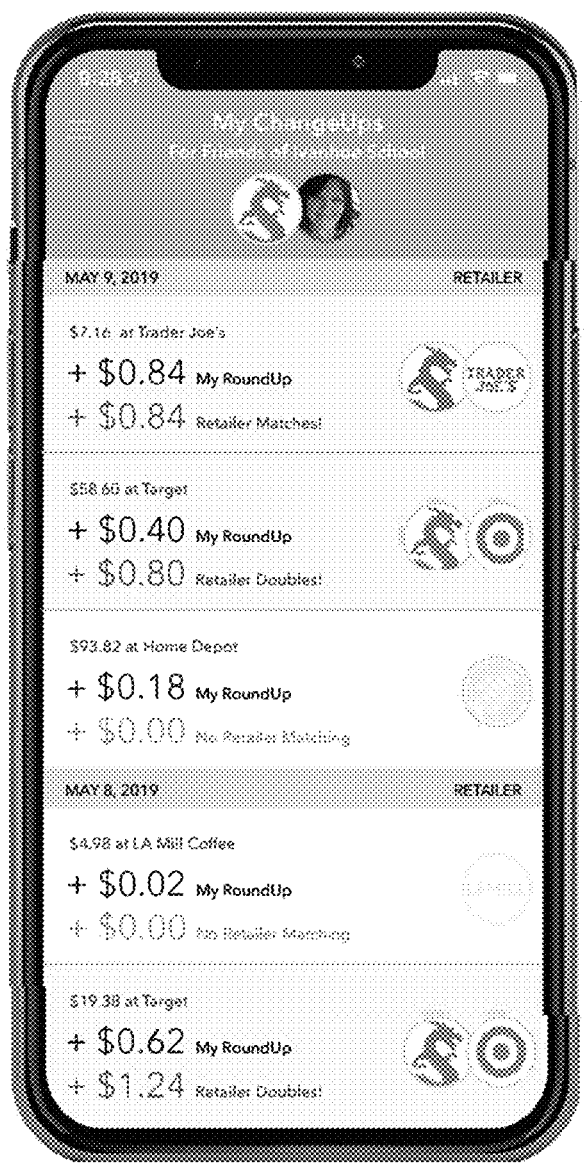
FIG. 6 is a screen shot of an exemplary embodiment of the present disclosure of a portfolio match between a customer's portfolio and a provider's portfolio.

FIG. 6 is an iPhone screen shot of an exemplary embodiment of the present disclosure of a portfolio match between a customer's portfolio and a provider's portfolio. In FIG. 6, a customer has a portfolio that contains only one charity. That portfolio (named Friends of Ivanhoe School) has received donations on two different dates, May 8, 2019 and May 9, 2019. On May 8, the customer made two purchases—one for $4.98 to LA Mill Coffee. There was not match between provider's portfolio and the customer's portfolio, so no provider contribution was made. However, the customer rounded-up the price of a cup of coffee that caused $0.02 to be put in her donor advised fund. In some embodiments, the rounded-up amount can be sent directly to the customer's charity. In another purchase on the same day, $19.38 was spent at Target and this time, the customer added $0.62 by rounding-up her purchase. Target had a special double match for that transaction and also matched its portfolio with customer's portfolio (both had Friends of Ivanhoe School as respective portfolio members). In this case $0.62 (from customer contribution) and $1.24 (from provider's double match), or a total of $1.86 was sent to customer's donor advised fund for contribution to customer's charity. In some embodiments, portfolio matching can be offered as a percentage of the purchase and be offered to the customer to be added to his portfolio of charities as, for example, 5% cash back and presented as a "round-up."

On May 9, three transactions are shown in the screen shot of FIG. 6. In the first two (Trader Joes and Target) portfolio matches were found between customer's portfolio and provider's portfolio so matches were made to the customer contribution "round-up" and provider's provider contribution. In fact, Target still matched customer contribution with a double provider contribution. In the last transaction of that day only the customer's "round-up" payment was made since Home Depot did not have a portfolio match with the customer.

Figure 7:
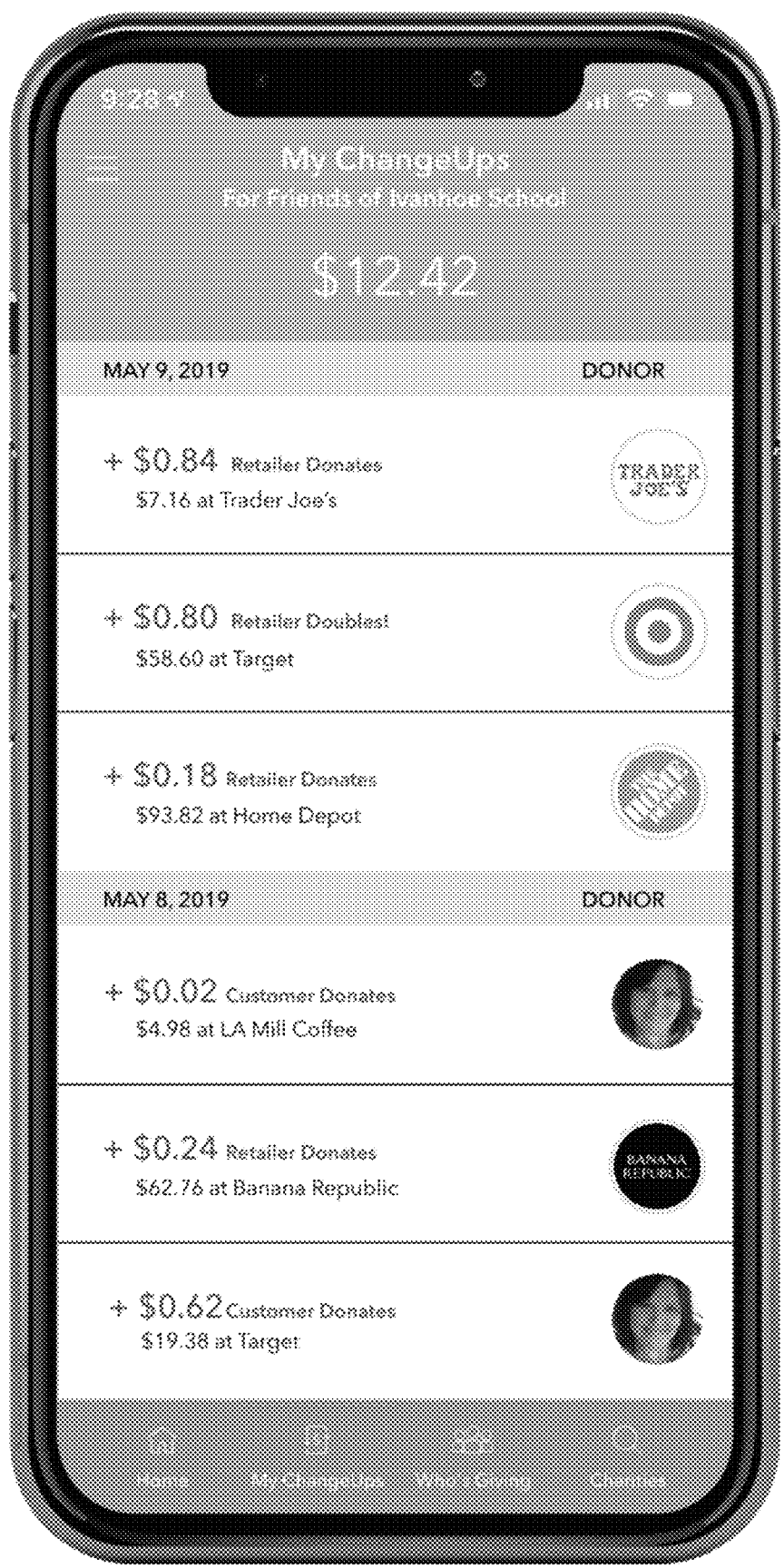
FIG. 7 is a screen shot of an exemplary embodiment of the present disclosure showing three customer match transactions on May 9, 2019 and one customer match and two customer nonmatches on May 8, 2019.

FIG. 7 is an iPhone screen shot of an exemplary embodiment of the present disclosure showing three customer match transactions on May 9, 2019 and one customer match and two customer nonmatches on May 8, 2019. FIG. 7 shows most of the same transactions made on May 8 and May 9. In this exemplary screen shot three "round-up" transactions were made by the customer to LA Mill Coffee, Banana Republic, and Target. This screen shot shows the amount contributed by the customer (and, in the case of Banana Republic a provider contribution) to customer's donor advised fund. The total amount spent at these three businesses is also tracked in this screen shot. Similarly, on May 9 three transactions were made a Trader Joes, Target, and Home Depot. The providers all matched the customer's contributions with provider contributions (and, in the case of Target they doubled the match). Again, the total spent at these three businesses is tracked.

Figure 8:
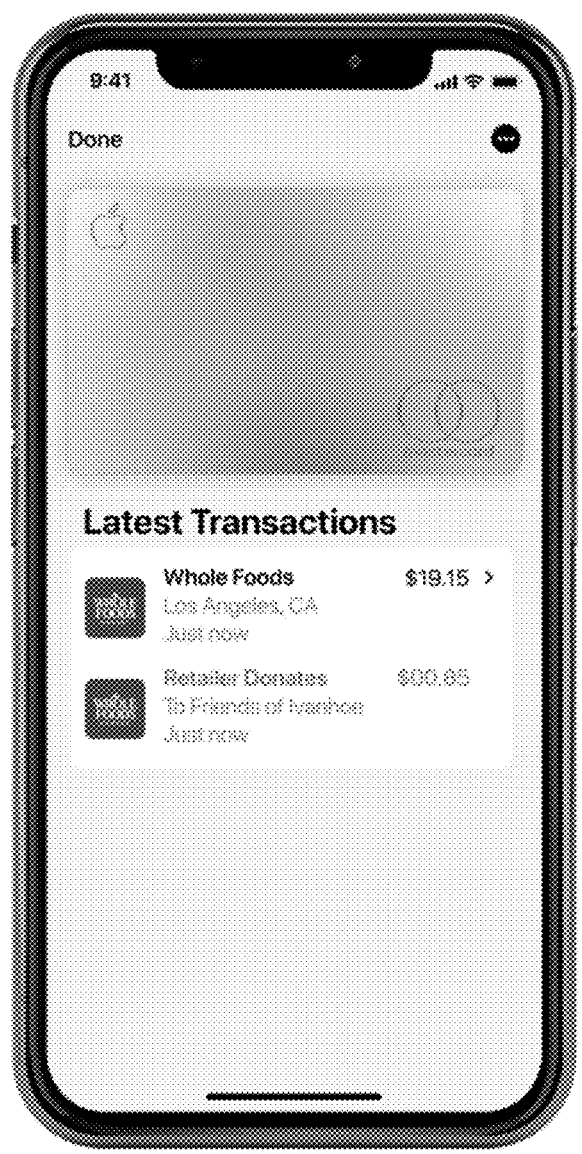
FIG. 8 is a screen shot of an exemplary embodiment of the present disclosure showing a transaction that includes a provider donation to one or more charities in the customer's portfolio.

FIG. 8 is an iPhone screen shot of an exemplary embodiment of the present disclosure showing and transaction that includes a provider donation to the customer's portfolio. This screen show shows a transaction of $19.15 made to Whole Foods and a donation of $0.85 to customer's portfolio (that contains one charity, Friends of Ivanhoe). In this example, only the provider has made a contribution to the customer's charity or portfolio of charities. The customer has not made his or her own rounded-up donation.

Figure 9:
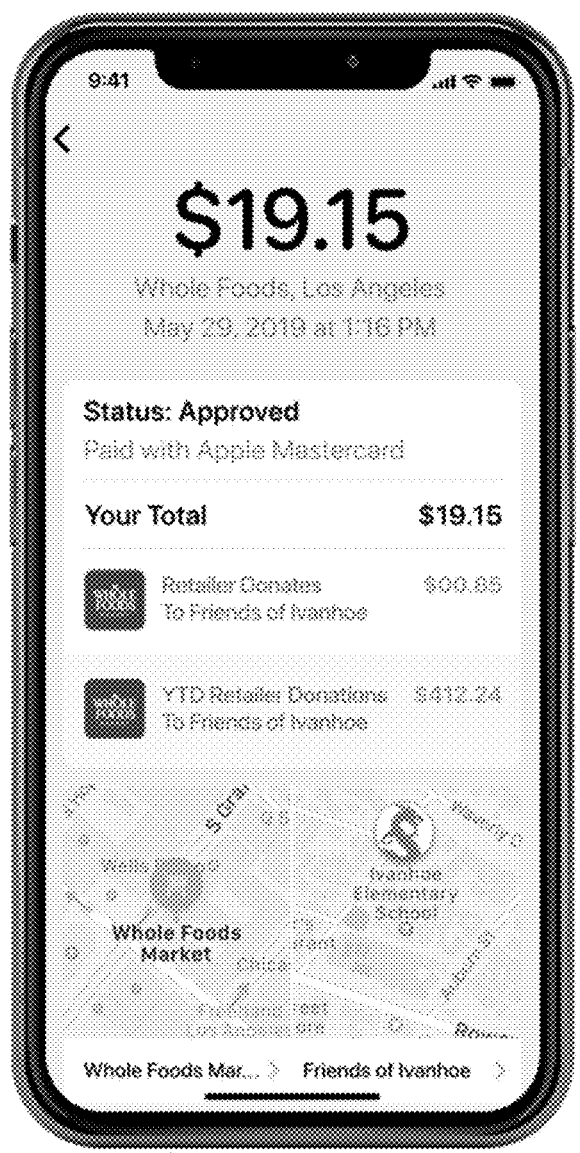
FIG. 9 is a screen shot of an exemplary embodiment of the present disclosure that shows a year-to-date report of the contributions of a provider to one or more charities in a customer's portfolio.

FIG. 9 is a screen shot of an exemplary embodiment of the present disclosure that shows a year-to-date report of the contributions of a provider to a customer's portfolio. This screen shot (paid with credit card) shows that a year-to-date (YTD) total of $412.24 has been made on behalf of multiple consumers in a circle giving group.

Figure 10:
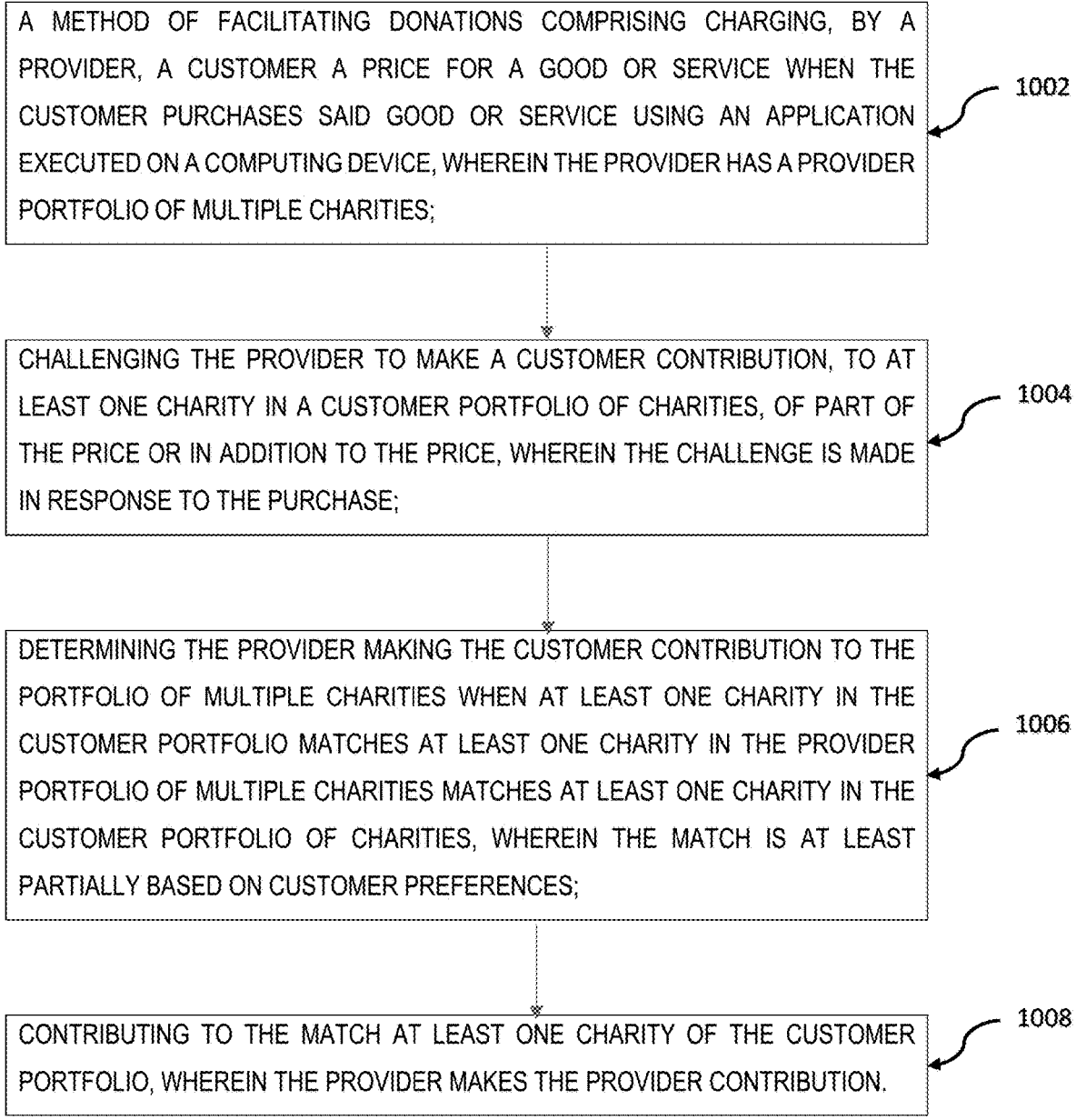
FIG. 10 is a flow chart of the method according to the disclosure of the method of the donation facilitation system.

FIG. 10 is a flow chart of the method according to the disclosure of the method of the donation facilitation system. In the figures, a method of facilitating donations includes charging, by a provider, a customer a price for a good or service when the customer purchases said good or service using an application executed on a computing device, wherein the provider has a provider portfolio of multiple charities 1002. The method may also include challenging the provider to make a customer contribution, to at least one charity in a customer portfolio of charities, of part of the price or in addition to the price, wherein the challenge is made in response to the purchase 1004. In some aspects, the method is illustrated as including determining the provider making the customer contribution to the portfolio of multiple charities when at least one charity in the customer portfolio matches at least one charity in the provider portfolio of multiple charities matches at least one charity in the customer portfolio of charities, wherein the match is at least partially based on customer preferences 1006. In some embodiments, the method may further include contributing to the match at least one charity of the customer portfolio, wherein the provider makes the provider contribution. 1008

Figure 11:
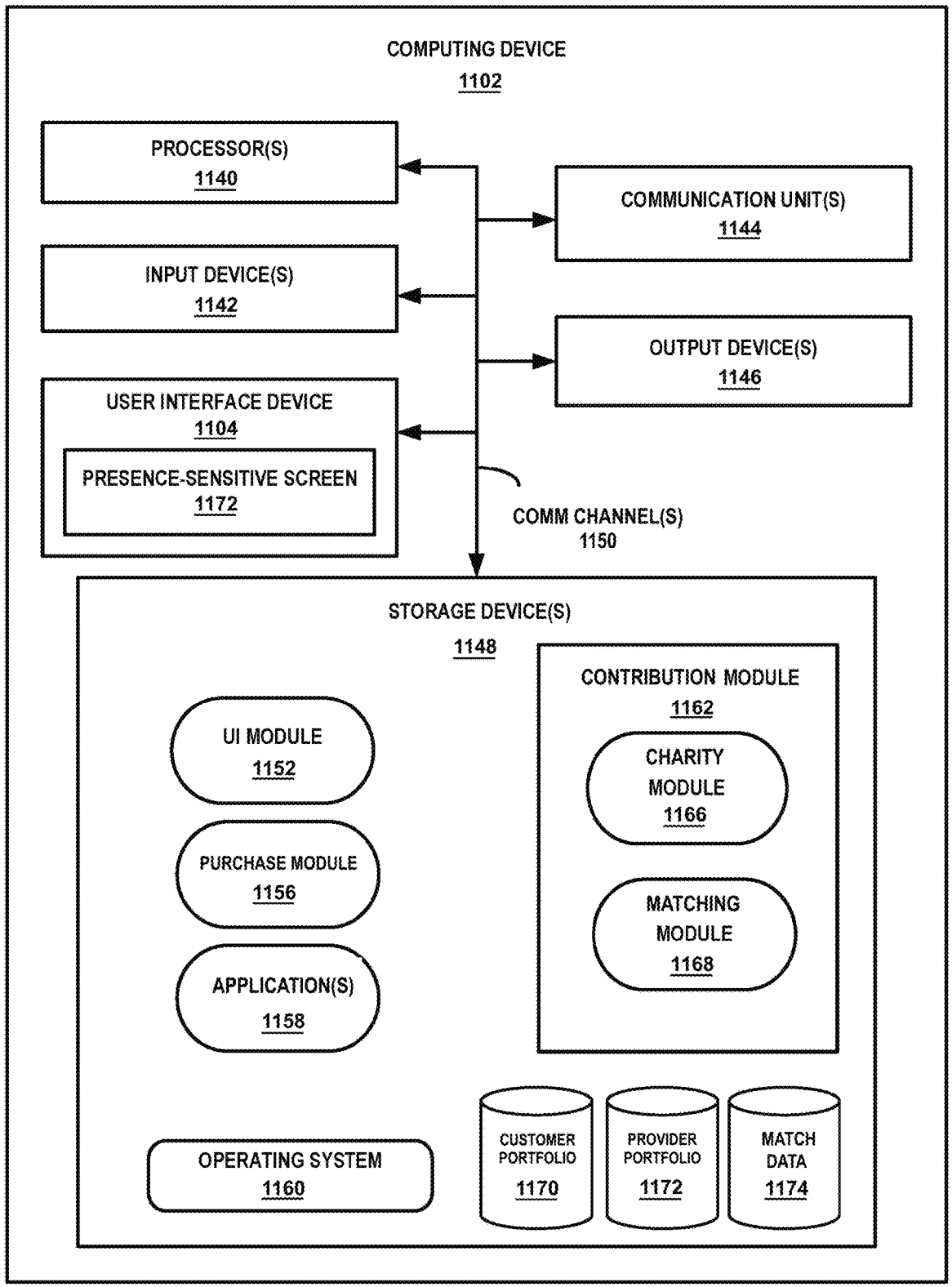
FIG. 11 is an illustration of the components of at least one of the computing device and the network server.

FIG. 11 is an illustration of the components of at least one of the computing device and the network server. FIG. 11 is one non-limiting embodiment that illustrates an example of a computing device that may implement a provider contribution to a portfolio of charities. The computing device 1102 may include a graphical user interface (GUI) device, such as user interface device 1104, for displaying information to the user. In some examples, the GUI device 1104 may receive user input and use the input to further process information. In the example of FIG. 11, the user may indicate that a certain charity may be selected for a contribution or an amount to contribute to the suggested charity. The user may press a button displayed at the GUI, UI, initiate a facial scanning app, voice command app, or video/phot app that has facial capture abilities, or simply touch the GUI to initiate a selection or preference choice, indicating a charity and/or a contribution/donation amount.

In some examples, contribution module 1162 may interact with application(s) 1158 may include an application module(s) on the computing device 1102 to acquire additional information or data. Application(s) 1158 may include a module (not illustrated) and may be referred to singularly as application 1158 or collectively as application(s) 1158. Applications 1158 may include a camera app, a video app, a shopping app, a donation app, a goods or services app, a profile or settings app with personal preferences, fingerprint app, security fingerprint access program, banking app, financial app, credit card app, microphone app, and other apps that may include programs or hardware interaction for shopping, and in some embodiments, for charitable donations.

In other embodiments, purchase module 1156 may be a type of shopping app, or in other embodiments, it may be a different module that accesses customer purchasing data and/or data for goods and services for sale. When purchase module 1156 is executed, data may be sent to charitable module 1162 regarding the purchase of good(s) or services(s). In one unlimiting instance, the customer may make a challenge for the provider to make a contribution to a charity or multiple charities. The challenge may be made when purchase module 1156 is executed or when the purchase information is sent to contribution module 1162. Contribution module 1162 then executes the protocols and procedures to determine the charities as described herein with charity module 1166 and matching module 1168.

In some instances, price information may be included in the data sent to contribution module 1162. In some examples, data is shared between applications 1158 and purchase module 1156. For example, the data shared may be regarding purchases made using applications 1158 and other data used to show customer preferences for certain goods or services. For example, if the customer was posting on a social media app about playing tennis, then the goods advertised for purchase may be related to new tennis clothing or equipment.

Contribution module 1162 may receive data from purchase module 1156 about the purchase and about user (customer) preferences. Preferences are not limited to goods, services, geographical location, posts on social media, emails, data received by microphone, data from camera, etc. Preferences may be based on the customer entering information into a customer account, on a profile or account setting, date, person's back ground, etc. Contribution module 1162 may communicate with charity module 1166 to determine a list of at least one charity that the customer may be interested in contributing to. In some embodiments, charity module 1166 may have a predetermined list of preferred charities identified or selected by the user. In some aspects, the information may be saved in a customer portfolio 1170. In some embodiments, charity module 1166 may use data associated with customer preferences form purchase module 1156 and/or application(s) 1158 to determine charities that the customer may prefer to contribute to. Charity module 1166 may then send to matching module 1168 the list of determined charities. Matching module 1168 may then compare the determine list with a list or portfolio of charities of the provider. In some aspects, the provider's portfolio is a list that the provider has already contributed to or a list of approved charities that the provider would contribute to. The list may be stored in provider portfolio 1172. In some embodiments, the charities in the provider portfolio are already approved, and in some embodiments, a request is sent to the provider for approval, so that the provider adds the requested charity to a list of accepted charities, for example by saving the charity in the provider's provider portfolio 1172, to be listed as a possible recipient of a provider contribution to the charity. In other examples, the provider may receive information from that network about charities available and preferred by the provider. Charity module 1166 may communicate through communication (comm) channels 1150 with a network to get information that is associated with the provider, and in some embodiments associated with the customer and/or the purchase. A selection of charities is made by the matching module 1168, where the customer portfolio of associated charities matches or likely similar to the providers list of provider portfolio, which is a list of charities associated with the preferences of the provider. The selection of charities made by the matching module 1168 may be stored in match data 1174 in association with the provider, and in some embodiments, in addition to the customer or alternatively in association with the customer. The match data 1174 may also or alternatively have the stored matched data. Portfolios of charity data and contributions may be updated and stored in customer portfolio 1170 and/or provider portfolio 1172 accordingly.

Storage devices, in some examples such as in storage device(s) 1148, have the primary purpose of being short term and not long-term computer-readable storage mediums. Storage devices on computing device may be configured for short-term storage of information as volatile memory and therefore not retain stored contents if powered off. Examples of volatile memories include random access memories (RAM), dynamic random access memories (DRAM), static random access memories (SRAM), and other forms of volatile memories known in the art. Storage devices may further be configured for long-term storage of information as non-volatile memory space and retain information after power on/off cycles. Examples of non-volatile memories include magnetic hard discs, optical discs, floppy discs, flash memories, or forms of electrically programmable memories (EPROM) or electrically erasable and programmable (EEPROM) memories. Storage devices may store program instructions and/or data associated with user interface module, purchase module, contribution module, charity module, matching module, operating system, financial module (not illustrated), and applications (e.g., using one of user settings datastore, account datastore, customer portfolio datastore, provider portfolio datastore, match datastore, and other none illustrated datastore). One or more processors may implement functionality and/or execute instructions within computing device. For example, processors on computing device may read and execute instructions stored by storage devices that execute the functionality of user interface, purchase transaction, account log in, application execution, customer profile updates, portfolio updates, selection of charity, entry of contribution amount identity, match and communication, operating system, and other applications. These instructions executed by processors may cause computing device to store information within storage devices during program execution, such as user settings, determined charity (portfolio); determined contribution; determined match; financial information; or associated with one or more of applications. Processors may execute instructions of determining contribution module to determine the charity(ies) of the portfolio, to determine contribution to the matched charity or charities, to determine the emergency care plan of the patient, and send contact communication and data. Computing device may include user interface ("UI") module, biometrics module, identity module, emergency care plan module. Computing device may use more than charity to determine the preference. Computing device 1102 may execute modules with multiple processors. Computing device may execute modules as a virtual machine executing on underlying hardware. UI module may receive data from components associated with computing device, such customer portfolio data or charity data or purchase data or contribution data. Using the data, UI module may cause other components associated with computing device to provide output based on the data.

In some embodiments, preferences are determined by assigning a value to the charity, or the data associated with a charity. When the value associated with the data, or the overall aggregate value associated with the charity, then the charity module 1166 may select that charity as a preferred charity that the user is likely to contribute to. The data around the transaction or purchase may also be used as part of the preference determination. Such as the date, purchase type, goods or services purchased, geographic region, current events, etc. The provider's portfolio may be predetermined or use similar likelihood techniques. Preference data, such as values associated with the charity, may be stored in the respective data store, such as customer portfolio 1170 associated with the customer and provider portfolio 1172 in association with the provider.

Matching module 1168 may use techniques for matching similarly. Such as using preference or likelihood techniques for determining that the charity associated with the customer or in the customer portfolio "matches" or has a strong likelihood of a match to a charity in the providers portfolio. Each respective portfolio may contain one charity or a plurality of charities that is more than one charity. Matching module 1168 then selects the matching charities and sends them to the contribution module 1162. The contribution module may send them to UI module 1152 to create a graphical display that can be output as a GUI at presence-sensitive screen.

The customer may enter information at the GUI for completing the transaction, such as confirming purchase of identification of a particular matched charity, when multiple matched charities are matched. In other instances, the provider may make the contribution to the matched charity (charities) upon completion of the purchase. In other instances, the request to make the purchase may be sent to the provider to execute the provider contribution to the matched charity. In this way, the provider directly makes the contribution. The amount of the contribution is described herein and may be at least one of a rounded amount based on the purchase price or total a set amount, or a percentage of the purchase amount. Other methods for determining the contribution about are also within the scope of the disclosure Any entered data at the GUI and any match data or likelihood data may be stored in association with the charity, purchase, customer, provider, or any combination thereof in the respective data storage location of storage device(s) 1148. Provider information of contributing the contribution to the charity or portfolio of charities may also be stored for future challenges. This data may then be utilized for future challenges and to determine preferences of the customer when future purchases are made. Other data received from the network may also be stored at storage device(s) 1148.

Figure 12:
FIG. 12 is an illustration of a computing device display showing provider contributions made to a charity in association with a purchase.

FIG. 12 is an illustration of a computing device display showing provider contributions made to a charity in association with a purchase. In this non-limiting illustration, the amount of the transaction is listed, such as the top line indicating $7.16 spent at "Trader Joe's" the retailer. 1202 The application determines the amount if the purchase price was rounded to the next dollar amount ($8.00), so the round up amount is $0.84. 1202 In one embodiment, the contribution system uses a general landing account, such as a Donor Advised Fund or other account, to receive donations and in turn distribute the donations or contributions to the end charity(charities). In this way, merchants are not empowered to send donations directly to charities. In another embodiment, merchants or contributors may send the donations or contributions to the charity (charities).

The amount is donated by the retailer to the charity, which is listed as "For Friends of Ivanhoe School." 1204 In one embodiment, the retailer donated to the school directly when the transaction was occurring. This is a type of instant contribution. In another embodiment, the micro-donations may not occur "when the transaction was occurring," but instead, may occur at a point after the transaction occurrence. As one further embodiment, when the contribution is after the transaction, the merchant may hold the funds for a period that can be seconds, minutes, days, months, etc., and then the merchant (or other "holder" of the funds) receives an invoice at the end of month much like sales tax. This and other examples of payment timing and process are within the scope of this disclosure.

Figure 13:
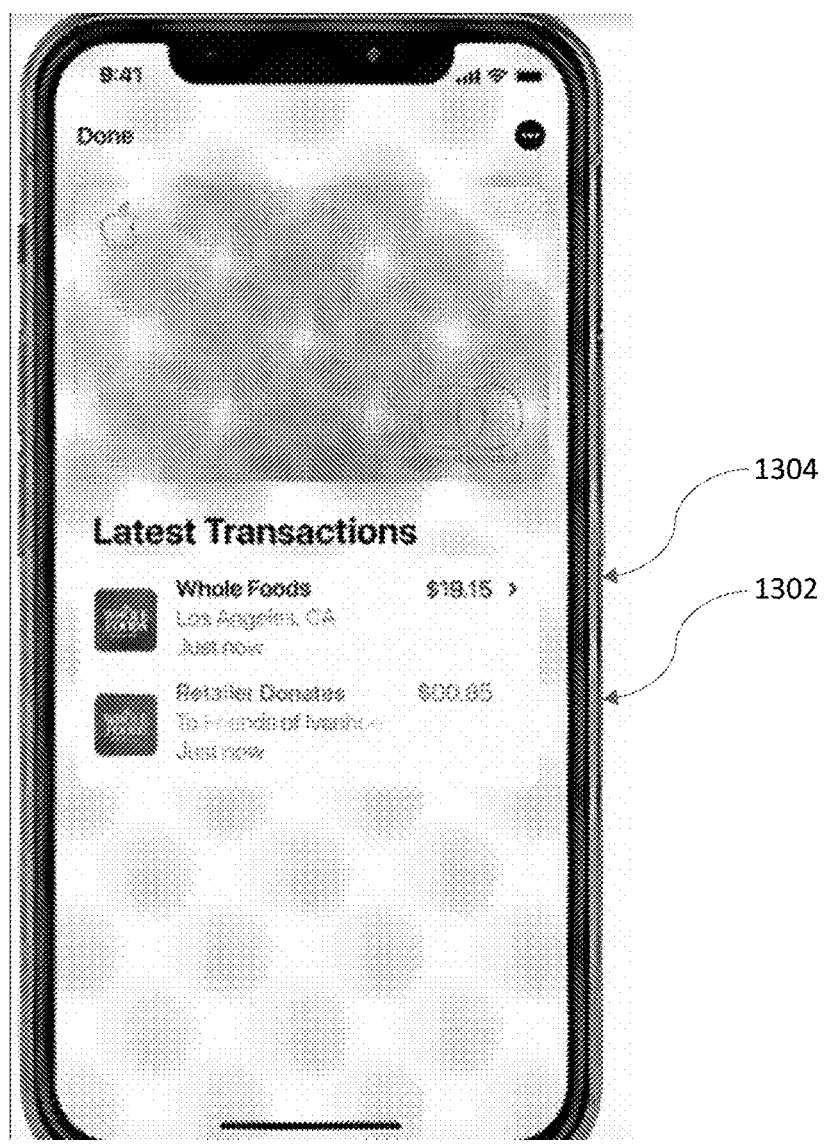
FIG. 13 is an illustration of a computing device display showing provider contributions made to a charity in association with a purchase.

FIG. 13 is an illustration of a computing device display showing provider contributions made to a charity in association with a purchase. In FIG. 13, the transaction was completed at a grocery store "Whole Foods" indicating a purchase of $19.15. 1304 Associated with this purchase, the retailer donated $0.85 to the charity/non-profit organization of "Friends of Ivanhoe" as depicted in the illustration. 1302 The donation was directly made to the indicated charity or non-profit organization. In one embodiment, the contribution system uses a general landing account, such as a Donor Advised Fund or other account, to receive donations and in turn distribute the donations or contributions to the end charity (charities). As described herein, direct payment to the charity (or charities) or other types of indirect payment from the contributor/merchant to the charity portfolio are considered as part of this disclosure.

The various embodiments described above are provided by way of illustration only and should not be construed to limit the claims attached hereto. Those skilled in the art will readily recognize various modifications and changes that may be made without following the example embodiments and applications illustrated and described herein and without departing from the true spirit and scope of the following claims.

What is claimed is:
1. A donation facilitation system comprising:
a data storage device that stores content;
a computing device of a customer configured to execute at least one application and containing at least one processor in communication with a network;
a network server containing at least one processor in communication with the computing device and in communication with the network, wherein the network serve includes information about at least one charity, and communicates with the at least one application executed on the computing device, further wherein the network server performs;

receiving a challenge, from at least one application executed on the computing device associated with the at least one customer, when the customer purchases a good or service, wherein the provider receives the challenge for a contribution to the at least one charity associated with a customer portfolio;

comparing, in response to the challenge, the at least one charity associated with the customer portfolio with the at least one charity associated with a provider portfolio to determine a match, which is based on likelihood of similarity of each of the respective charities in the customer and provider portfolios; and contributing the contribution by the provider to the match, which includes at least one charity.

2. The donation facilitation system according to claim 1, wherein the provider contribution is a fixed percentage of the purchase or a fixed fee based upon the purchase.

3. The donation facilitation system according to claim 1, wherein the customer portfolio information is stored in at least one of the data storage device of the computing device and the network.

4. A donation facilitation system comprising (local computing device):
a data storage in a computing device that stores content;
a network server containing at least one processor in communication with the computing device in communication with the network, wherein the network serve includes information about at least one charity, and communicates with the at least one application executed on the computing device;
the computing device, of a customer, configured to execute at least one application and containing at least one processor in communication with a network, further wherein the at least one computing device processors perform the steps of:
executing an app for purchasing goods or services
sending a challenge, from at least one application executed on the computing device associated with the at least one customer, when the customer purchases a good or service, wherein the provider receives the challenge for a contribution to the at least one charity associated with a customer portfolio;
comparing, in response to the challenge, the at least one charity associated with the customer portfolio with the at least one charity associated with a provider portfolio to determine a match, which is based on likelihood of similarity of each of the respective charities in the customer and provider portfolios;
selecting, by the user, at least one charity; and
contributing the contribution by the provider to the match, which includes the at least one charity.

5. The donation facilitation system according to claim 4, wherein the fixed challenge amount is based on at least one of a predetermined value, a fixed percentage of the price or the fixed challenge amount is a fixed fee per transaction.

6. The donation facilitation system according to claim 4, wherein the challenge comprises a challenge amount.

7. The donation facilitation system according to claim 4, wherein the provider contribution meets or exceeds the challenge amount, or is less than the challenge amount.

8. The donation facilitation system according to claim 4, wherein the contribution is stored in the network and the at least one charity in the customer portfolio is updated and associated with preferences of the customer.

9. The donation facilitation system according to claim 4, further comprising a server comprising the customer portfolio of at least one charity, the provider portfolio of at least one charity, or both.

10. The donation facilitation system according to claim 4, further comprising at least one computing device in communication with the server for payment of the contribution.

11. The donation facilitation system according to claim 4, wherein the at least one computing device comprises a mobile device.

12. The donation facilitation system according to claim 4, wherein the at least one computing device allows the provider to access the customer challenge, customer portfolio of at least one charity, or the provider portfolio of at least one charity.

13. The donation facilitation system according to claim 4, wherein the provider comprises a financial institution, a processor, a payment network, a card network, merchants, or individuals.

14. The donation facilitation system according to claim 4, further comprising a challenge contribution made by the provider to at least one charity of the customer portfolio of charities in response to the challenge; wherein the customer portfolio information is stored in at least one of the data storage of the computing device and the network, and an amount of the contribution is based on the price of the purchased good or service.

15. The donation facilitation system according to claim 4, wherein the challenge contribution is made to a donor advised fund.

16. The donation facilitation system according to claim 14, wherein the provider contribution comprises a fixed challenge amount or a rounding amount based on the purchase price.

17. The method of facilitating donations comprising:
utilizing a data storage that stores content;
executing, on a computing device of a customer, at least one application, wherein the computing device contains at least one processor in communication with a network server;
sending a charge, by a provider to a customer based on a price for a good or service, when the customer purchases said good or service using an application executed on a computing device, wherein the provider has a provider portfolio of at least one charity;
challenging the provider to make a contribution, to at least one charity in a customer portfolio of at least one charity, of an amount that is a part of the price or in addition to the price, wherein the challenge is made in response to the purchase;
contributing, by the application executed on the computing device and in communication with the network server, the contribution made by the provider to the portfolio of at least one charity when at least one charity in the customer portfolio matches at least one charity in the provider portfolio; and
contributing to the match of at least one charity of the customer portfolio, wherein the provider makes the provider contribution.

18. The method of facilitating donations according to claim 17, wherein the provider contribution comprises a fixed percentage of the price, or a fixed fee for each transaction.

19. The method of facilitating donations according to claim 17, further comprising using a server to store at least one of: the customer portfolio, the provider portfolio, and the match based on customer preferences.

20. The method of facilitating donations according to claim 18 further comprising at least one computing device in communication with the server, wherein the server is part of a network, and further wherein the provider makes the provider contribution directly or from a donation fund account to the at least one charity.

21. The method of facilitating donations according to claim 17, wherein the computing device comprises at least one of a mobile device, laptop, electronic notebook, desktop computer, smartwatch, tablet, smart phone, smart watch, and other electronic computing devices.

\* \* \* \* \*